US012774592B2

(12) United States Patent
Lockwood et al.

(10) Patent No.: US 12,774,592 B2
(45) Date of Patent: Oct. 27, 2026

(54) APPARATUS AND METHOD FOR CONSERVING SHOWER WATER

(71) Applicant: ShowerNow LLC, Timnath, CO (US)

(72) Inventors: Bruce Lockwood, Timnath, CO (US); David Lockwood, Spearfish, SD (US); Frank Strazzabosco, Erie, CO (US); Sean Flickinger, Lakewood, CO (US)

(73) Assignee: ShowerNow LLC, Timnath, CO (US)

( * ) Notice: Subject to any disclaimer, the term of this patent is extended or adjusted under 35 U.S.C. 154(b) by 58 days.

(21) Appl. No.: 19/034,206

(22) Filed: Jan. 22, 2025

(65) Prior Publication Data

US 2025/0237044 A1 Jul. 24, 2025

Related U.S. Application Data

(60) Provisional application No. 63/624,207, filed on Jan. 23, 2024.

(51) Int. Cl.
*E03C 1/04* (2006.01)
*G01K 1/143* (2021.01)
*G01K 1/16* (2006.01)
*G01K 3/00* (2006.01)

(52) U.S. Cl.
CPC ............ *E03C 1/0408* (2013.01); *G01K 1/143* (2013.01); *G01K 1/16* (2013.01); *G01K 3/005* (2013.01); *E03C 2001/0418* (2013.01)

(58) Field of Classification Search
None
See application file for complete search history.

(56) References Cited

U.S. PATENT DOCUMENTS 4,030,360 A * 6/1977 Fortune .................. G01K 13/02 73/431
6,705,534 B1 * 3/2004 Mueller ............. G05D 23/1393 236/12.12
6,925,661 B1 * 8/2005 Anger ................ G05D 23/1393 4/541.2
7,252,431 B1 8/2007 Caramanna
(Continued)

FOREIGN PATENT DOCUMENTS

WO WO-2023121481 A2 * 6/2023 ......... G01N 33/0098

OTHER PUBLICATIONS

International Search Report and Written Opinion of Mar. 18, 2025, PCT Patent Application No. PCT/US2025/012587.

*Primary Examiner* — Muhammad Adnan
(74) *Attorney, Agent, or Firm* — James R. Young; Cochran Freund & Young LLC

(57) ABSTRACT

An apparatus and method for prompting a person using a shower to conserve water includes a shower temperature sensing and signal producing unit for mounting on a shower pipe to sense when hot water arrives in the shower pipe and to signal the shower user that the hot water has arrived, thus time to start showering. The apparatus includes a housing that clamps onto the shower pipe, and a heat conducting pin conducts heat from the shower pipe outside the housing to a temperature sensor inside the housing, where the temperature is sensed and transduced to electrical signals that are processed to produce the signals to the shower user. The apparatus is portable and self-actuating so that it can be moved from one shower to another without any switching on or off or adjustments.

16 Claims, 8 Drawing Sheets

(56) References Cited

U.S. PATENT DOCUMENTS

| | | | | |
|---|---|---|---|---|
| 7,490,373 | B1 * | 2/2009 | Zavala-Avelar | E03C 1/0408 4/615 |
| 8,220,722 | B1 * | 7/2012 | Shaffer | E03C 1/05 236/94 |
| 8,316,883 | B1 | 11/2012 | Watson | |
| 8,438,672 | B2 | 5/2013 | Reeder | |
| 9,254,499 | B2 | 2/2016 | Klicpera | |
| 9,266,136 | B2 * | 2/2016 | Klicpera | B05B 12/02 |
| 9,273,451 | B2 | 3/2016 | Brunoli | |
| 9,552,706 | B2 | 1/2017 | Schneider | |
| 9,632,514 | B2 | 4/2017 | Marty | |
| 9,757,741 | B2 | 9/2017 | Hawkins | |
| 10,489,038 | B2 | 11/2019 | Klicpera | |
| 11,141,024 | B2 | 10/2021 | Dickson | |
| 2004/0028118 | A1 * | 2/2004 | Sidoni | G01K 1/143 374/E1.019 |
| 2005/0205680 | A1 * | 9/2005 | Valente | E03B 1/048 236/12.11 |
| 2006/0203880 | A1 | 9/2006 | Batchco | |
| 2006/0227847 | A1 * | 10/2006 | Johnson | G01K 1/14 374/E1.019 |
| 2009/0323761 | A1 * | 12/2009 | Tsai | G01K 13/02 374/E13.006 |
| 2011/0031331 | A1 | 2/2011 | Klicpera | |
| 2011/0139269 | A1 * | 6/2011 | Rogers | E03C 1/046 137/339 |
| 2011/0210188 | A1 | 9/2011 | Yao | |
| 2012/0233765 | A1 | 9/2012 | Altman | |
| 2013/0333764 | A1 * | 12/2013 | Wright | E03C 1/0408 137/551 |
| 2016/0076231 | A1 * | 3/2016 | Goel | E03C 1/0408 700/283 |
| 2017/0350103 | A1 | 12/2017 | Lee et al. | |
| 2018/0094413 | A1 * | 4/2018 | Chaky | E03C 1/055 |
| 2018/0291592 | A1 * | 10/2018 | Spiro | G05D 23/1393 |
| 2018/0298596 | A1 * | 10/2018 | Tsai | E03C 1/0408 |
| 2019/0242096 | A1 * | 8/2019 | Hamilton | E03C 1/0408 |
| 2022/0025621 | A1 | 1/2022 | Backus | |
| 2022/0136223 | A1 | 5/2022 | Boyer | |
| 2023/0381795 | A1 * | 11/2023 | Hooper | E03C 1/057 |
| 2024/0402144 | A1 * | 12/2024 | Bloomer | G01N 33/0098 |

* cited by examiner

APPARATUS AND METHOD FOR CONSERVING SHOWER WATER

BACKGROUND OF THE INVENTION

1. Technical Field of the Invention

This invention is related to water saving apparatus and methods for showers.

2. Technical Background

Many places in the United States and in other countries face water supply shortages, some chronically, and others intermittently. As a result, many local and state governments and conservation groups have been calling for voluntary water conservation from users, and some have imposed restrictions on water use or penalties for excessive water use. In response, many individuals as well as businesses have adopted voluntary water conservation measures in their homes and businesses. Several, but not the only, examples of such water conservation measures include low flush volume toilets, waterless urinals, hotels encouraging visitors to limit uses of multiple towels, municipal restrictions on lawn watering, low flow shower heads, and the like. A growing awareness of water wastage in showers in homes as well as in hotel rooms and other facilities that are provided for people to take showers has stimulated a variety of measures and devices for encouraging or even imposing water conservation behavior for persons using showers.

An inherent problem in most homes, some hotels, and other shower facilities is that the source of hot water, e.g., a hot water heater, is located some distance from the shower, and the hot water in pipes that convey the hot water from the hot water source to the shower tend to cool quite quickly to ambient temperature when the shower is not running. Water at such ambient temperatures is usually uncomfortably cool for most people. Accordingly, when a person turns on the shower, a common and fairly natural human response to the cool water that first flows from the shower is to turn on the shower and then wait for hot water from the hot water source to push the cool water in the pipes out of the shower head before getting into the shower. Of course, that cool water then simply runs down the drain of the shower and is wasted. Unfortunately, another common human response for a person waiting for the hot water to arrive in the shower is to turn away from the shower and become involved and sometimes pre-occupied in other activities and not notice, thus not return to the shower, when the hot water eventually arrives, which results in a waste of not only the cool water, but also a waste of a significant amount of hot water, flowing down the drain. Such waste of hot water not only wastes water, but also the energy that was consumed to heat that wasted hot water. Myriad devices have been proposed and designed to address such wastes of hot shower water, including temperature sensors, audio and visual alerts, timers, controllers, etc., but portability and user convenience issues remain.

The foregoing examples of related art and limitations related therewith are intended to be illustrative, but not exclusive or exhaustive, of the subject matter. Other aspects and limitations of the related art will become apparent to those skilled in the art upon a reading of the specification and a study of the drawings.

BRIEF DESCRIPTION OF THE DRAWINGS

The accompanying drawings, which are incorporated herein and form a part of the specification, illustrate some, but not the only or exclusive, example embodiments or features or both. It is intended that the embodiments and figures disclosed herein are to be considered illustrative rather than limiting.

In the drawings.

DETAILED DESCRIPTION OF EXAMPLE EMBODIMENTS

Figure 1:
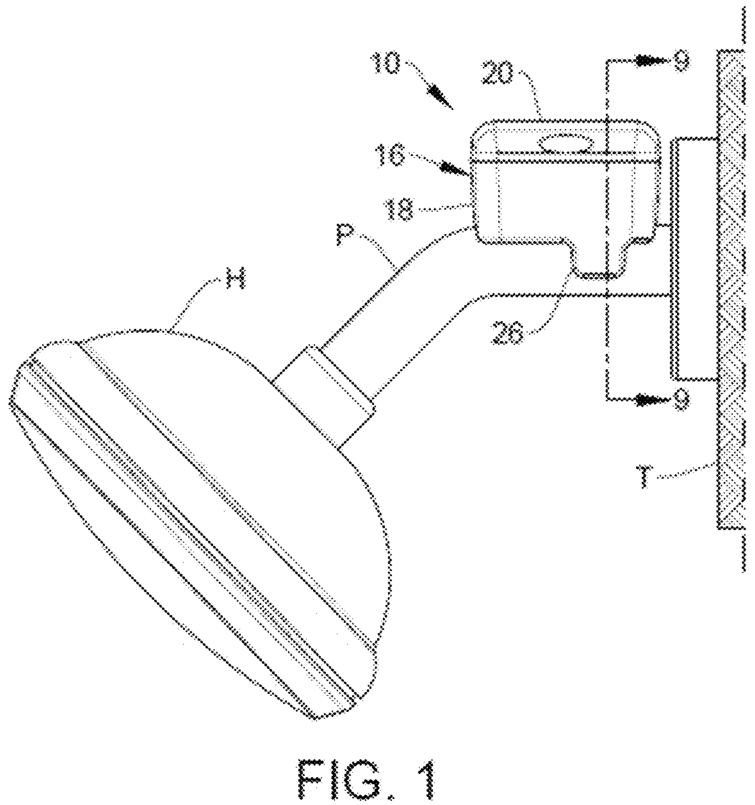
FIG. 1 is a side elevation view of an example shower water conservation apparatus illustrated mounted for use on a conventional shower pipe.
Figure 2:
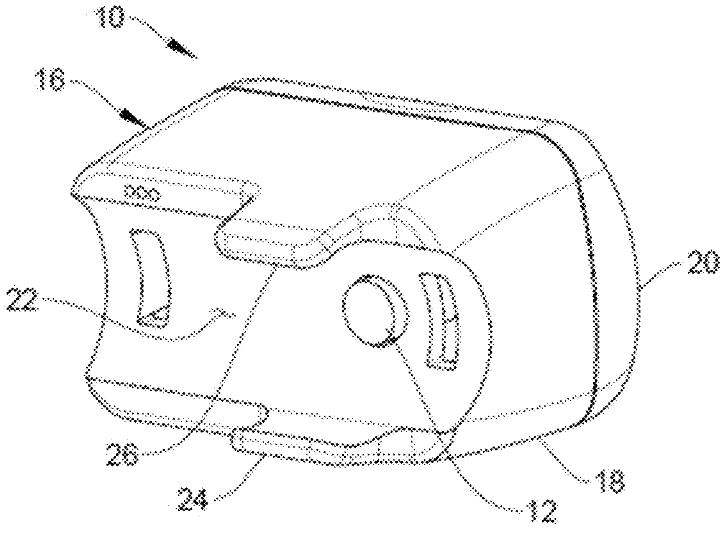
FIG. 2 is a perspective bottom view of the example shower water conservation apparatus.

An example shower water conservation apparatus 10 is shown in FIG. 1 mounted on a conventional shower pipe P between a wall T from which the pipe P protrudes and a conventional shower head H, where the shower water conservation apparatus 10 can sense the temperature of the shower pipe P. The shower water conservation apparatus 10 utilizes the temperature of the shower pipe P as an indicator of the temperature of water flowing in the shower pipe P to the shower head H to produce prompt signals perceivable by a shower user (not shown) that prompt the shower user to act in ways that minimize waste of water and energy while taking a shower, as will be explained in more detail below.

Figure 9:
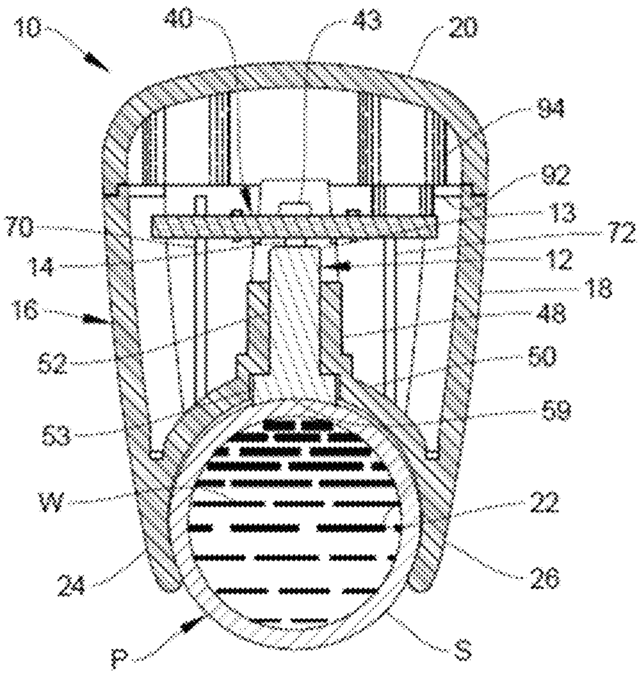
FIG. 9 is an enlarged cross-section view of the example shower water conservation apparatus taken along the section plane 9-9 in FIG. 1.

In a typical shower installation, the shower pipe P protrudes from a wall T, as illustrated in FIG. 1, and conducts shower water to the shower head H to be dispensed from the shower head H. Referring now to FIG. 9, heat in the shower water W in the pipe P is conducted from the shower water W, through the shower pipe P, to the outside surface S of the shower pipe P. A heat conducting pin 12 in the shower water conservation apparatus 10, which is placed in contact with the outside surface S of the shower pipe P by mounting the shower water conservation apparatus 10 on the shower pipe P, conducts the heat from the shower pipe P to a heat sensor 14 in the shower water conservation apparatus 10, where the heat can be detected and transduced to an electric signal for processing to produce the prompt signals perceivable by the shower user, as will be explained in more detail below. In the example shower water conservation apparatus 10, the prompt signal perceivable by the shower user is an audible signal, although it could easily be implemented instead or in addition as a visually perceivable signal, as will be understood by persons skilled in the art once they understand the details of the example shower water conservation apparatus 10 as described below.

Referring now primarily to FIGS. 1-6 and 9, the example shower water conservation apparatus 10 is a relatively small, portable device that can be easily mounted onto, and easily removed from, a conventional shower pipe P. A housing 16 comprises a main body portion 18 and a cover portion 20. The cover portion 20 is mountable on, and removable from, the top of the main body portion 18. The bottom of the main body portion 18 is a concavity 22 that is sized and shaped to fit over a portion of the external surface S of the shower pipe P, as best seen in FIG. 9. Most conventional shower pipes in the United States are made of ½-inch NPT (National Pipe Thread standard), which is nominally the same size as the conventional ½-inch BSP (British Standard Pipe) shower pipes used in much of the rest of the world. Therefore, the concavity 22 in the example shower water conservation apparatus 10 illustrated in FIGS. 1-6 and 9 is shown as being sized to fit that size shower pipe, thus can be used on most shower pipes in the United States and other parts of the world. However, the concavity 22 could be sized and shaped to fit other non-conventional shower pipes as well. A pair of resilient flange clamp pieces 24, 26 extend downwardly from opposite sides of the main body portion 18 to clamp the main body portion 18 onto the shower pipe P. Essentially, as the main body portion 18 is pushed onto the shower pipe P, the two flange clamp pieces 24, 26 are forced to flex outwardly, away from each other, to allow the main body portion 18 to be inserted onto the shower pipe P so that the shower pipe P is positioned in the concavity 22 of the main body portion 18, whereupon the two flange clamp pieces 24, 26 resiliently clamp the main body portion 18 onto the shower pipe P. The main body portion 18 can be made of any material that resiliently yields to such an outwardly directed force on the flange clamp pieces 24, 26 while retaining an inherent material memory biased to return the flange clamp pieces 24, 26 inwardly to clamp the main body portion 18 onto the pipe P. A polypropylene plastic (PP) is but one example of such a material, and persons skilled in the art will recognize myriad other materials that would be suitable for that purpose and function.

Figure 3:
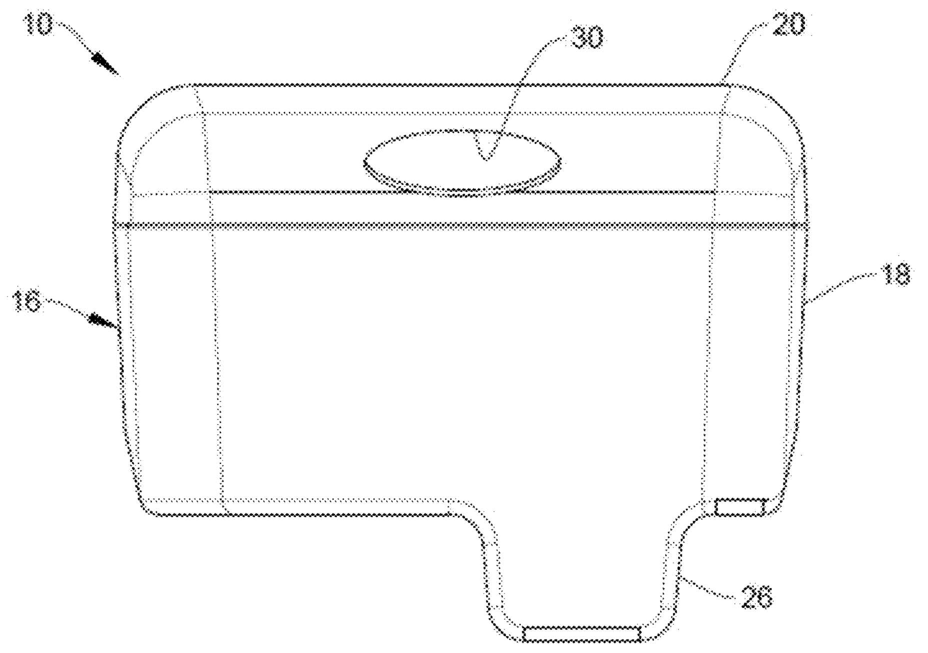
FIG. 3 is a right side elevation view of the example shower water conservation apparatus from the perspective of a person (not shown) viewing the example shower water conservation apparatus while standing in the shower.
Figure 4:
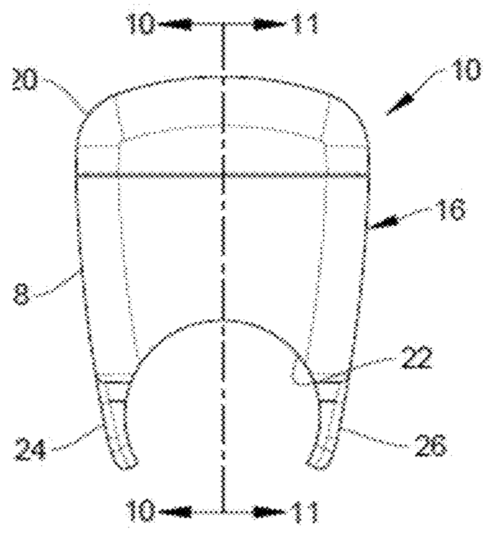
FIG. 4 is a front end elevation view of the example shower water conservation apparatus from the perspective of a person (not shown) viewing the example shower water conservation apparatus while standing in the shower.
Figure 5:
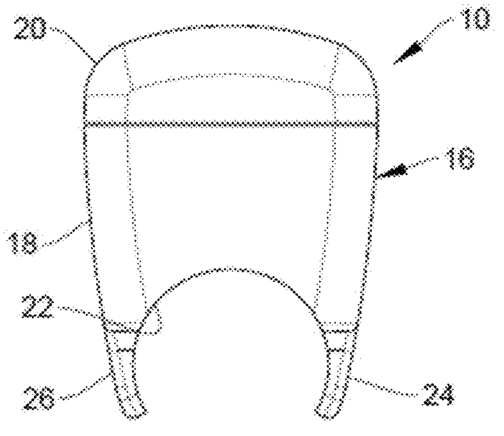
FIG. 5 is a back end elevation view of the example shower water conservation apparatus from the perspective of a person (not shown) viewing the example shower water conservation apparatus while standing in the shower.
Figure 6:
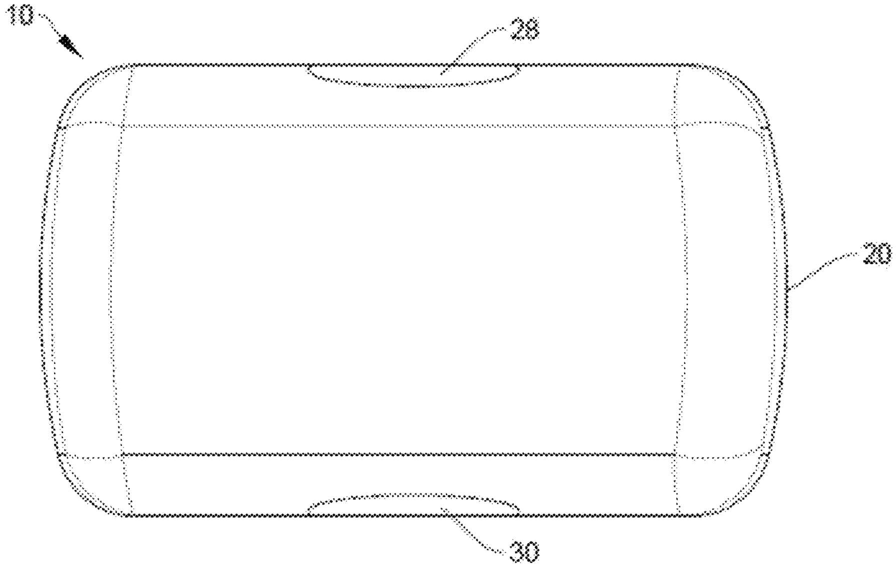
FIG. 6 is a top plan view of the example shower water conservation apparatus.
Figure 8:
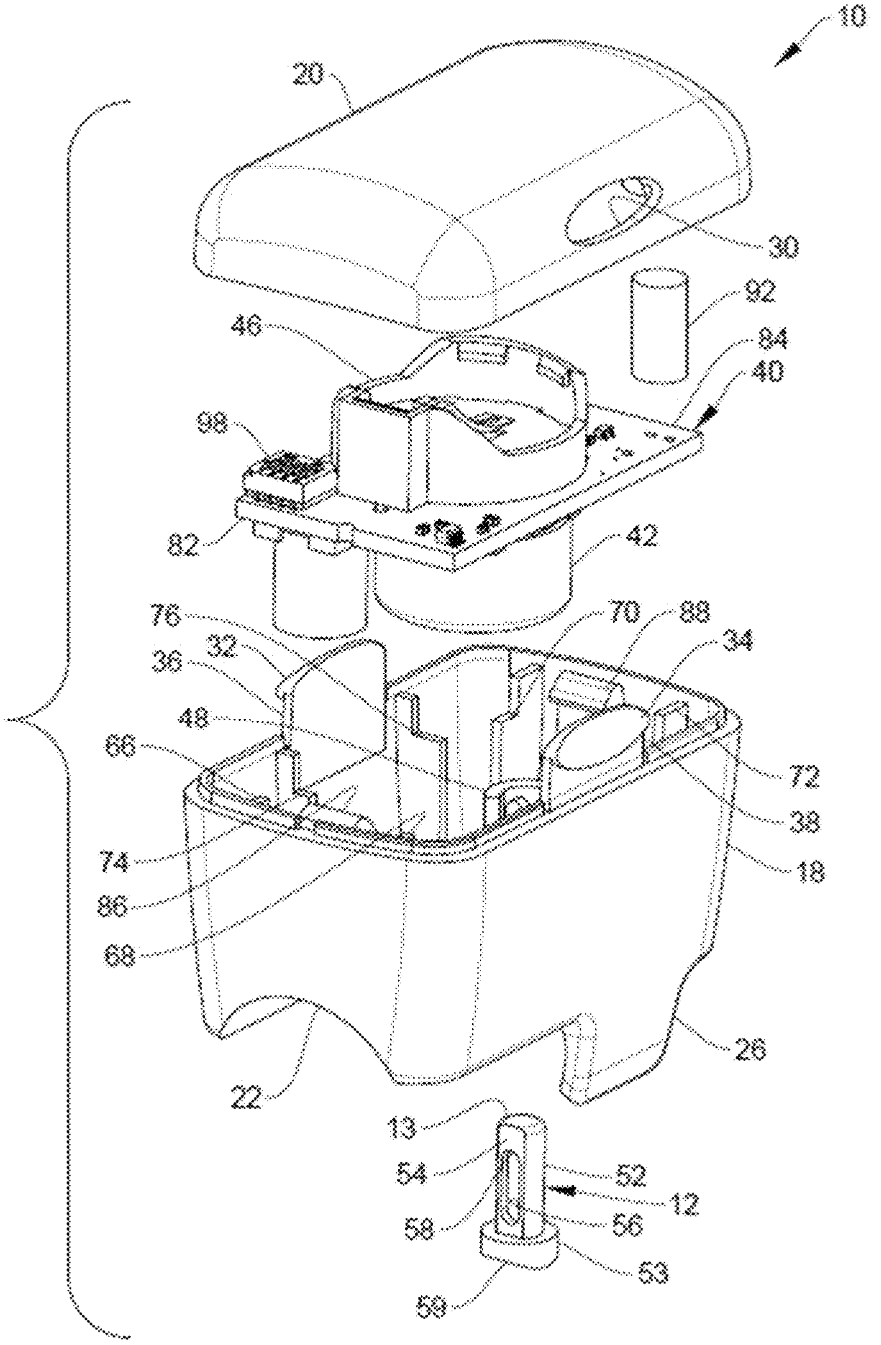
FIG. 8 is an exploded view of the example shower water conservation apparatus.

Perhaps best seen in FIGS. 3, 6, and 8, the cover portion 20 of the housing 16 is removably attached to the main body portion 18 by a button and hole latch arrangement. Each lateral side of the cover portion 20 has a respective latch hole, for example, the left side latch hole 28 and the right side latch hole 30, and each lateral side of the main body portion 18 has a respective latch button, for example, the left side latch button 32 and the right side latch button 34. The latch buttons 32, 34 are shaped and sized to fit into the respective latch holes 28, 30, and are supported by respective resiliently flexible stanchions 36, 38 that extend upwardly from respective sides of the main body portion 18. When the cover portion 20 is mounted on the main body portion 18, an inherent resilient memory in the material of the stanchions 36, 38 bias the respective latch buttons 32, 34 laterally outward and into the respective latch holes 28, 30. To unlatch and remove the cover portion 20 from the main body portion 18, a person can use, for example, a finger and a thumb of one hand to press the latch buttons 32, 34 inwardly, against the inherent outward bias of the respective resilient stanchions 36, 38, to move the latch buttons 32, 34 out of the respective latch holes 28, 30 to disengage the latch buttons 32, 34 from the cover portion 20 so that the cover portion 20 can be lifted away from the main body portion 18. To replace the cover portion 20 onto the main body portion 18, the person can simply place the cover portion 20 over the main body portion 18 with the latch holes 28, 30 in alignment with the respective latch buttons 32, 34 and push the cover portion 20 toward the main body portion 18, which moves the latch buttons 32, 34 inwardly against the inherent material bias of the respective stanchions 36, 38 until the latch buttons come into axial alignment with the respective latch holes 28, 30, whereupon the inherent material bias of the stanchions 36, 38 moves the latch buttons 32, 34 into the respective latch holes 28, 30 to latch the cover portion 20 onto the main body portion 18.

As mentioned above, and as best seen in FIGS. 9-11, the heat conducting pin 12 conducts heat from the outer surface S of the shower pipe P to a heat sensor 14, which transduces the heat to an electrical signal that is processed electrically to produce a signal (e.g., the prompt signal) that is perceptible by a user of the shower. The pin 12 can be made of any heat conducting material, one example of which is aluminum. In the example shower water conservation apparatus 10 illustrated in FIGS. 9-11, the heat sensor 14 is a component on a printed circuit board 40, which is mounted in the interior of the main body portion 18 of the housing 16 in a manner that places the heat sensor 14 in heat conducting contact with the distal end 13 of the heat conductive pin 12. An optional thermal conduction paste (not shown) can be placed at the interface between pin 12 and the heat sensor 14 to enhance the heat conduction from the pin 12 to the heat sensor 14. Persons skilled in the art are well aware of a variety of thermal conduction pastes that can provide that heat conducting enhancement function. Also, in the example shower water conservation apparatus 10 illustrated in FIGS. 9-11, a speaker 42 is shown mounted on the printed circuit board 40 for producing an audio signal (e.g., the prompt signal) that is perceivable by a person using the shower as discussed above, although a light emitting diode (LED) or other light emitting device (not shown) could be mounted on, or connected to, the printed circuit board 40 for producing a visual signal instead of, or in addition to, the audible signal, as also mentioned above. A buzzer or some other sound producing device could be used to produce the audible signal instead of the speaker 42. A microcontroller 44 as well as other typical electronic components to power and support the microcontroller 44 are also mounted on the printed circuit board 40 for receiving and processing the electric signals produced by the heat sensor 14 to drive the speaker 42 (or to drive an LED if so equipped). A battery holder 46 is also shown mounted on the printed circuit board 40 for holding a battery, for example a lithium coin cell style battery (not shown in FIGS. 7-11), to power the electronic components of the printed circuit board 40.

Figure 10:
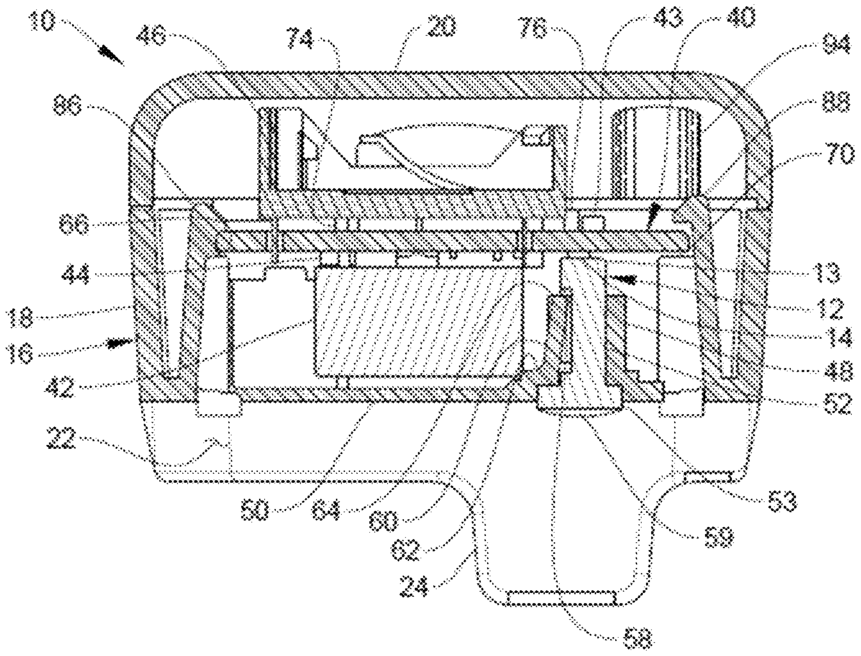
FIG. 10 is an enlarged cross-section view of the example water conservation apparatus taken along the section plane 10-10 in FIG. 4.
Figure 11:
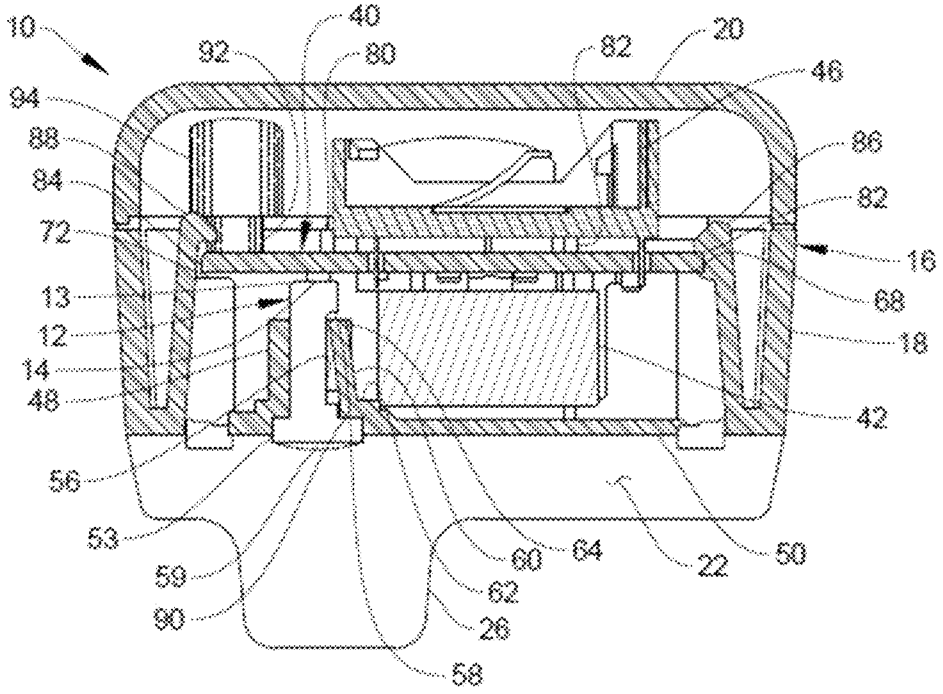
FIG. 11 is an enlarged cross-section view of the example shower water conservation apparatus taken along the section plane 11-11 in FIG. 4.

As also best seen primarily in FIGS. 9-11 and secondarily in FIG. 8, the heat conducting pin 12 is mounted in a cylindrical sleeve 48 that protrudes from the bottom wall 50 of the housing 16 into the interior of the main body portion 18 toward, but not all the way to, the printed circuit board 40. The pin 12 comprises a shank 52 extending from a flanged head 53. The shank 52 of pin 12 has a flattened side 54 and a slot 56 in the flattened side 54 extending longitudinally toward, but not all the way to, the distal end 13 of the pin 12 to form a shoulder 58 at the distal end of the slot 56. The proximal surface 59 of pin head 53 is curved to conform to the outer surface S of the shower pipe P (e.g., the same radius) to maximize heat conductivity from the pipe P to the pin 12. A resilient latch finger 60 forming a portion of the cylindrical sleeve 48 extends from a base portion 62 of the sleeve 48 to a distal end 64 of the latch finger 60 is resiliently biased to extend the distal end 64 inwardly toward the center of the cylindrical sleeve 48. The width of the latch finger 60 is sized to fit into the longitudinal slot 56 in pin 12 when the pin 12 is inserted into the cylindrical sleeve 48. Therefore, as the pin 12 is inserted into the cylindrical sleeve 48 from the bottom of the housing 16, shank 52 of the pin 12 bears against the latch finger 60 and forces the latch finger 60 against the inherent inward bias of the latch finger 60 to move the distal end 64 of the latch finger 60 outwardly, i.e., in a direction away from the center of the cylindrical sleeve 48. However, when the pin 12 is inserted far enough into the cylindrical sleeve 48 for the longitudinal slot 56 in the pin 12 to become aligned radially and longitudinally with the distal end 64 of the latch finger 60, the inherent inward bias of the latch finger 60 causes the distal end 64 of the latch finger 60 to move into the longitudinal slot 56 in the pin 12. As best seen in FIGS. 10 and 11, once the distal end 64 of the latch finger 60 moves into the longitudinal slot 56, the pin 12 cannot be removed from the cylindrical sleeve 48, because distal end 64 of the latch finger 60 will bear against the shoulder 58 of the slot 56 and prevent such removal. This feature retains the pin 12 securely in the sleeve 48 when the example shower water conservation apparatus 10 is removed from the shower pipe P.

With continued reference now primarily to FIGS. 9-11 and secondarily to FIG. 8, the printed circuit board 40 is mounted at least nominally on end brackets 66, 68, 70, 72 and side brackets 74, 76, 78, 80 in the main body portion 18 of the housing 16. However, to accommodate tolerances while ensuring a secure and effective heat conductive interface between the pin 12 and the heat sensor 14 on the printed circuit board 40, the printed circuit board 40 is mounted in a manner that accommodates a slight pivotal movement of the printed circuit board 40 about the contact points between the front end 82 of the printed circuit board 40 and the front end brackets 66, 68, such that the back end 84 of the printed circuit board can move slightly upwardly and downwardly in relation to the back end brackets 70, 72. In particular, a front clip 86 fastens the front end 82 in a vertically and horizontally immovable, but pivotal, manner to the front end brackets 66, 68. However, a back clip 88 loosely retains the back end 84 of the printed circuit board 40 against excessive vertical and horizontal movement, but allows some limited vertical movement of the back end 84 of the printed circuit board 40 in relation to the back end brackets 70, 72. Also, as best seen in FIGS. 10 and 11, while the pin 12 is shown inserted all the way into the cylindrical sleeve 48, where the pin head 53 abuts the bottom surface 90 of the cylindrical sleeve 48, there is a small gap between the distal end 64 of the latch finger 60 and the shoulder 58 of the longitudinal slot 56. Therefore, the pin 12 can move the distance of that gap longitudinally upwardly and downwardly in the cylindrical sleeve 48, and the printed circuit board 40 can pivot enough to accommodate movement of the heat sensor 14 upwardly and downwardly commensurate with the upward and downward movement of the pin 12, thereby maintaining the physical, thus heat conductive, contact of the heat sensor 14 with the distal end 64 of the pin 12 throughout such movement. Accordingly, if the housing 16 of the shower water conservation apparatus 10 should happen to be pushed not quite as far down as possible on the shower pipe P, the pin 12 may be moved downwardly enough so that the pin head 53 still touches the outer surface S of the pipe P, and the printed circuit board 40 can pivot downwardly in a commensurate manner to maintain the physical, thus heat conductive, contact of the heat sensor 14 with the distal end 64 of the pin 12. On the other hand, if the housing 16 is pushed down as far as possible on the shower pipe P, thus causing the shower pipe P to push the pin 12 upwardly in the cylindrical sleeve 56, the distal end 64 of the pin 12 pushing upwardly on the heat sensor 14 can be accommodated by the ability of the printed circuit board 40 to pivot upwardly. In the example shower water conservation apparatus 10, an optional compression spring device 92, best seen in FIGS. 8, 9, and 11, is provided to bear on the front end 82 of the printed circuit board 40 and, thereby, bias the front end 82 of the printed circuit board 40 downwardly, which, through the interface of the heat sensor 14 with the distal end 13 of the pin 12, also biases the pin 12 downwardly. Therefore, when the housing 16 is pushed downwardly on the shower pipe P enough to cause the surface S of the shower pipe P to push the pin 12 upwardly in the cylindrical sleeve 48, the distal end 64 of the pin 12 pushes upwardly on the heat sensor 14 against the bias of the compression spring device 92, which helps to maintain a secure, heat conductive contact between the pin 12 and the heat sensor 14, and, as explained above, the ability of the printed circuit board 40 to pivot accommodates such movement. The compression spring device 92 illustrated in FIGS. 8, 9, and 11 is a resilient foam rubber, for example, a silicone foam material in a cylindrical shape, although other spring devices could also be used, including, but not limited to, for example, a spiral wire compressions spring (not shown), a resilient strap spring (not shown) and others that are known to persons skilled in the art. The example resilient foam rubber compression spring device 92 is mounted in a cylindrical retainer 94 formed in the cover portion 20 of the housing 16. While the printed circuit board 40 in the example shower water conservation apparatus 10 is shown and described above as pivotal to accommodate the movement or positioning of the pin 12, the entire printed circuit board 40, e.g., both the front end 82 and the back end 84, could be mounted in a manner that accommodates such upward and downward movement, and additional compression spring devices 92 could also be used.

Figure 7:
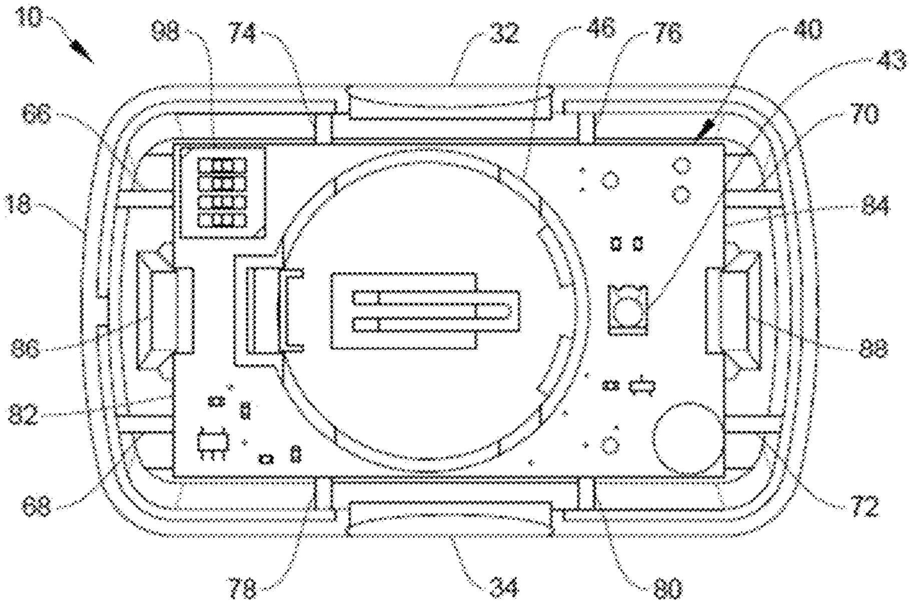
FIG. 7 is a top plan view of the example shower water conservation apparatus, but with the cover removed to reveal the printed circuit board in the interior of the example shower water conservation apparatus.
Figure 12:
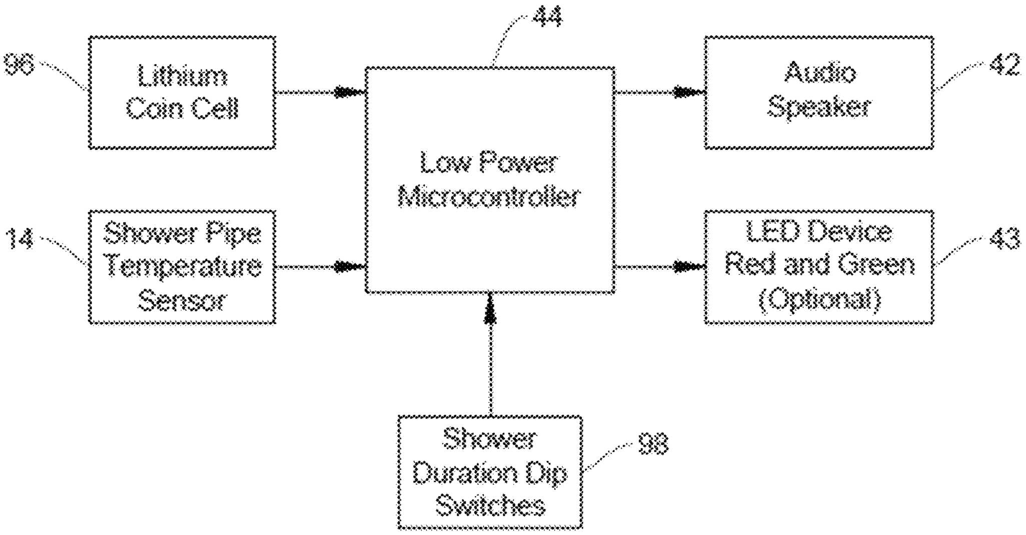
FIG. 12 is an example system block diagram of the example shower water conservation apparatus.

As mentioned above, the heat sensor 14, also sometimes called a temperature sensor, transduces heat conducted by the pin 12 from the shower pipe P to the heat sensor 14 to an electrical signal that is indicative of the temperature of the shower pipe P, thus also indicative of the temperature of the water W in the shower pipe P. An electronic circuit on the printed circuit board 40 processes the electric signal from the heat sensor 14 according to instructions in firmware built into the microcontroller 44 on the printed circuit board 40 to produce the prompt signals perceivable by a user of the shower, for example, audible sounds or visual light signals or both, as will be explained in more detail below. A system block diagram of the signal processing electronic circuit is shown in FIG. 12, where a battery 96, e.g., a lithium coin cell type battery, powers the electric circuit, including the microcontroller 44. The electric signals from the shower temperature sensor, i.e., the heat sensor 14, is fed to the microcontroller 44, which processes those signals and outputs driving signals to the speaker 42 at times and for durations determined by the firmware in the microcontroller 44. Dip switches 98, or some other input device, connected to the microcontroller 44 can be used to set time parameters, for example shower time duration, as will be explained in more detail below. The dip switch component 98 is also shown in FIG. 7 mounted on the printed circuit board 40.

Figure 13A:
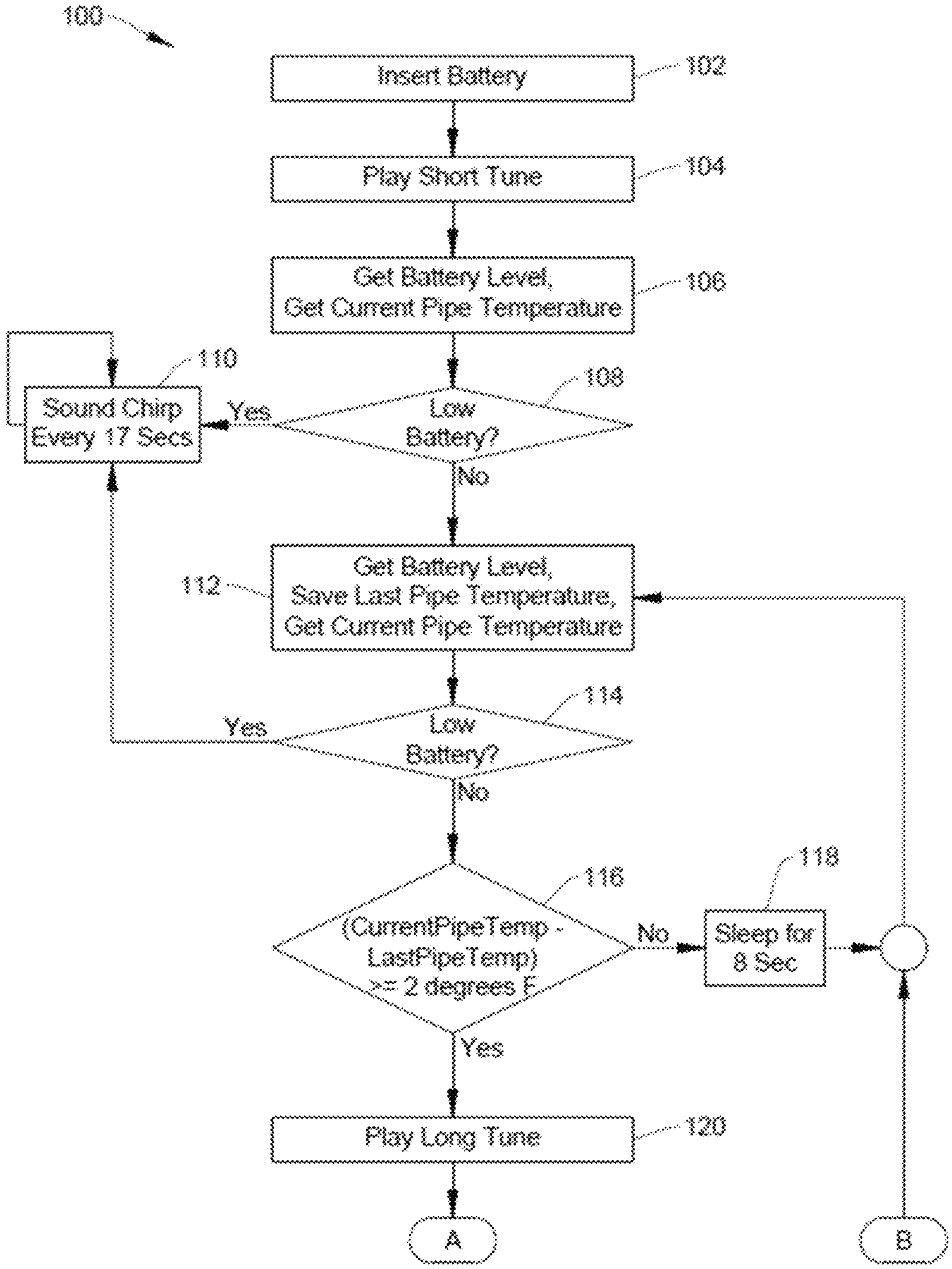
FIGS. 13A and 13B together show an example logic flow diagram for operating the example shower water conservation apparatus.
Figure 13B:
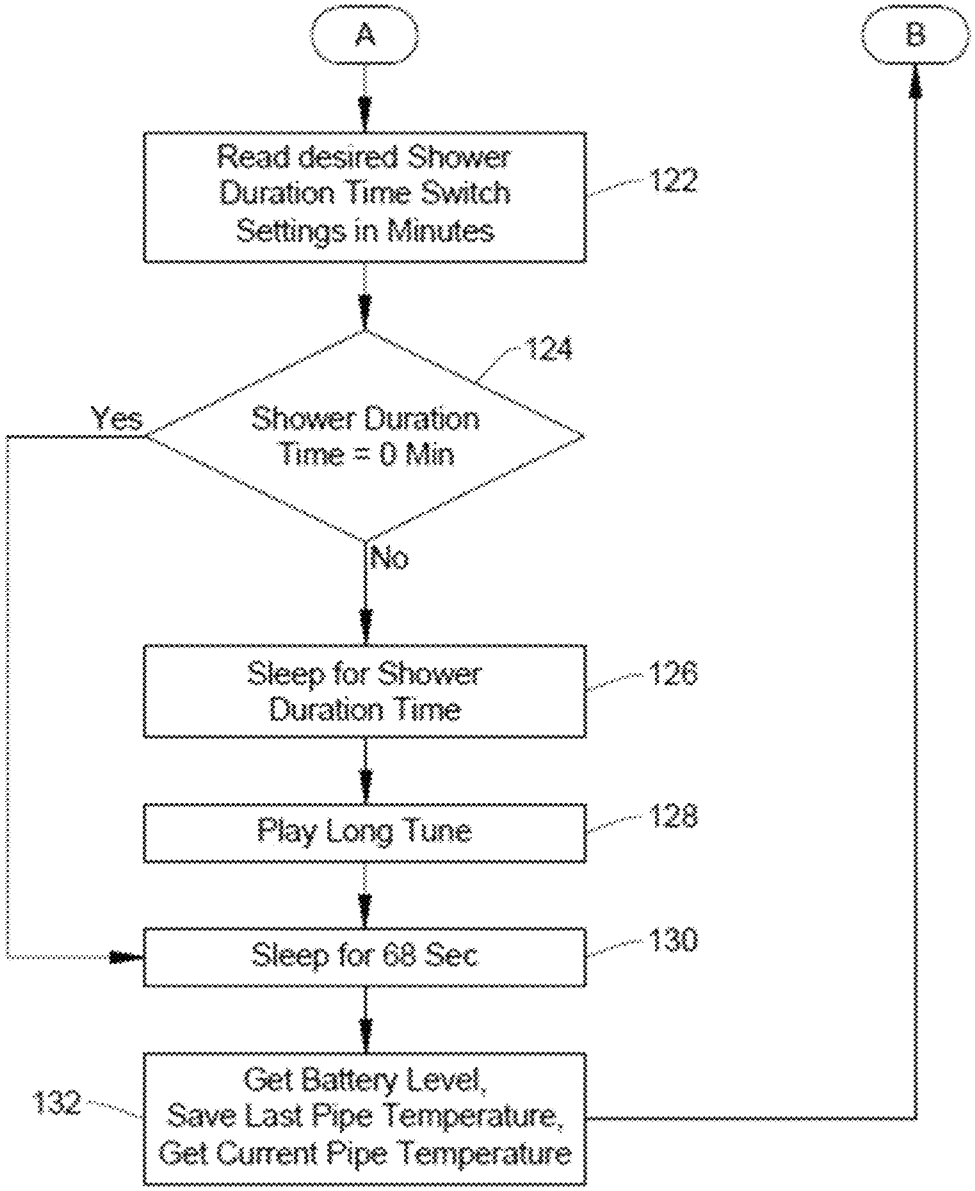

A logic flow diagram 100 in FIGS. 13A and 13B illustrates example signal processing steps implemented by the microcontroller 44. When a battery 96 (FIG. 12) is inserted into the battery holder 46 (FIGS. 7-11) at step 102, the microcontroller 44 (FIGS. 10 and 12) outputs a signal at step 104 to drive the speaker 42 (FIGS. 8 and 10-12) to play a short tune to indicate the circuit, including the battery is inserted properly and the microcontroller is powered. At step 106, the microcontroller gets the battery level from the battery 96 and gets the current pipe temperature from the heat sensor 14. At step 108, the microcontroller determines if the battery level is low, i.e., insufficient to power the circuit reliably in the manner programmed into the microcontroller 44. If the battery is determined at step 108 to be low, i.e., "YES" at step 108, the microcontroller proceeds to step 110, which is a cycle of sound chirps at repeating intervals, for example, every 17 seconds, to signal the shower user that the battery is low and the normal operating functions of the shower water conservation apparatus 10 are not implemented.

On the other hand, if the battery is determined at step 108 to not be low, i.e., "NO" at step 108, then the microcontroller proceeds to step 112, where the microcontroller gets the battery level again, saves the last pipe temperature, i.e., the pipe temperature obtained at step 106, and gets a new current pipe temperature. At step 114, the microcontroller determines if the battery level acquired at step 112 is low, and, if so, i.e., "YES" at step 114, the microcontroller proceeds to step 110, which is the cycle of repetitive chirps to signal to the shower user that the battery is low and needs to be changed.

If the microprocessor determines at step 114 that the battery is not low, then at step 116 the microprocessor compares the "current pipe temperature" obtained at step 112 to the previous pipe temperature obtained at step 106 and saved at step 112 as the "last pipe temperature." If that comparison at step 116 of that "current pipe temperature" to that "last pipe temperature" shows that the "current pipe temperature" minus the saved "last pipe temperature" is not greater than or equal to a predetermined value (e.g., two (2) degrees Fahrenheit), i.e., a step 116 result of "NO", then the microcontroller sleeps for a preset time, e.g., eight (8) seconds, at step 118 before cycling back to step 112.

At the step 112, after the eight (8) seconds sleep at step 118, the microprocessor again gets the battery level, saves the "last pipe temperature," which was the "current pipe temperature" at the previous function at step 112, and gets a new "current pipe temperature". A determination again at step 114 if the battery level obtained at step 112 is low. If so, the microcontroller proceeds to step 110 to sound the repetitive chirps, and, if not, the microcontroller proceeds again to the decision function at step 116.

If the decision function at step 116 determines that the "current pipe temperature" at step 116 minus the saved "last pipe temperature" is greater than or equal to a predetermined value (e.g., 2 degrees Fahrenheit), i.e., the step 116 result is "YES", then the microcontroller drives the speaker at step 120 to play a tune, e.g., a longer tune than the short tuned played at step 104, to signal the shower user that hot water from the hot water source, e.g., hot water heater, has arrived at the shower pipe P, which is an indication to the shower user that the shower water can provide a comfortable shower. Note that the "YES" result at step 116 does not indicate that the shower water is at any particular temperature, but that hot water from the hot water source has arrived at the shower pipe on which the shower water conservation apparatus 10 is mounted. The user may still adjust the shower water temperature with the hot and cold shower valves as desired to whatever is comfortable for the user. With that knowledge, triggered by the tune at step 120, the user can act to get into the shower without wasting any more water.

Upon determining at step 116 that hot water from the hot water source has arrived at the shower and playing the tune at step 120 to so notify the shower user, the microcontroller then proceeds to step 122 (FIG. 13B), where the microcontroller reads the desired shower duration time from an input device, for example the setting of the dip switches 98 (FIGS. 7, 8, and 12). At step 124 the microcontroller determines if the shower duration obtained at step 122 is zero or greater than zero. For example, a user may use the input device, e.g., dip switches 98, to input a desired shower duration time of, for example, 0, 1, 2, 3, 4, 5, 6, 7, 8, 9, 10, 11, 12, 13, 14, or 15 minutes. An appropriate, yet tolerable, shower duration setting for an effective shower without wasting water or heating energy may be, for example, six (6) minutes.

If the microcontroller determines that there is a shower duration time greater than zero set by the input device, e.g., by the dip switches 98, then the microcontroller sleeps at step 126 for the duration of the set shower duration time. The presumption at this sleep step 126 is that the shower user is taking a shower. Then, when the set shower duration time at step 126 has elapsed, the microcontroller plays another tune at step 128, for example another tune longer than the tune that was played at step 104, to signal to the shower user that the set shower duration time has expired. That long tune at step 128 is intended to inspire the user to turn off the shower so as to not waste any more water. Of course, the user may or may not actually turn off the shower at that time at the user's discretion. The example shower water conservation apparatus 10 has no way of forcing the actual shut-off of the shower.

After playing the long tune at step 128 to notify the shower user that the set shower duration has expired, the microcontroller sleeps at step 130 for an extended period of time, for example, sixty-eight (68) seconds, to give the shower water time to start cooling down, assuming that the shower user has actually turned off the shower water.

However, if the shower duration time at step 124 is determined to be zero, i.e., the step 124 result is "YES", the microcontroller bypasses the sleep step 126 for a shower duration and the long tune play step 128 for the end of a shower duration, and instead proceeds directly to the extended sleep step 130.

After the extended period of sleep time at step 130, the microprocessor proceeds to step 132, where it gets the battery level again, saves the "last pipe temperature", which at step 132 is the same as the "current pipe temperature" obtained at the last iteration through step 112, i.e., at the start of the shower before the long tune at step 120, the shower duration time at step 126, the long tune at step 128, and the 68 seconds sleep at step 130. At step 132, the microcontroller also gets the then "current pipe temperature" at step 132, i.e., the current pipe temperature immediately after the 68 seconds sleep step 130.

However, for the purpose of determining when hot water arrives again in the shower pipe P from the hot water source for the start of a new shower, the next iteration through the determining step 116, the microcontroller needs the "last pipe temperature" saved to be a pipe temperature obtained after the end of the previous shower, not the pipe temperature at the start of the previous shower. Therefore, to make the "last pipe temperature" for the next iteration through the determining step 116 be the same as the "current pipe temperature" obtained at step 132, i.e., after the end of the previous shower cycle, the microcontroller returns from step 132 to step 112. At step 112, the "current pipe temperature" obtained at step 132, i.e., after the 68 seconds sleep step 130, is saved as the "last pipe temperature" for use in the next determining step 116. Also at step 112, the microcontroller gets a new battery level for the battery low determination at step 114 and a new "current pipe temperature" for the next determining step 116.

If the shower user actually turned the shower off upon hearing the long tune play at step 128, the extended sleep duration at step 130, e.g., sixty-eight (68) seconds sleep, the shower water and shower pipe P would probably have cooled to some extent by the time the microcontroller performs the functions in the step 132 and immediately thereafter in the step 116. Therefore, the conditions for the microcontroller to signal the start of a new shower cycle at step 120, i.e., the "current pipe temperature" at step 116 minus the saved "last pipe temperature" obtained at step 132 after the extended sleep step 130 is greater than or equal to a predetermined value (e.g., 2 degrees Fahrenheit), are likely to occur when hot water from the hot water source arrives at the shower.

However, if the shower user did not turn off the shower upon hearing the long tune played at step 130, the pipe temperature obtained at step 132 would still be shower temperature hot, and the conditions at the determining step 116 for signaling the start of a new shower at step 120 would not be met. Therefore, the microprocessor would sleep for the predetermined short time at step 118 (e.g., eight (8) seconds), before cycling back again to step 112 without signaling the start of a new shower cycle. That bypass cycle through the short sleep step 118 would repeat continuously until the conditions at the determining step 116 for signaling the start of a new shower at step 120 are met. Accordingly, nothing on the example shower water conservation apparatus 10 has to be turned on or off between showers or at the beginning or end of a shower, regardless of whether it is left mounted on one shower pipe or moved to any one or more other shower pipes, for example, moving from hotel room to hotel room while traveling. The microcontroller simply continues cycling through the steps as explained above, whether the shower water conservation apparatus 10 is mounted on a shower pipe or packed in a suitcase. Whenever the conditions at step 116 are met for signaling hot water has arrived, it will play the tune at step 120 and proceed through the shower cycle, but, if the conditions at step 116 are not met, it simply cycles continuously through the bypass step 118 until the step 116 conditions for the start of a shower cycle are met again. Accordingly, a shower user does not have to remember to, or decide to, turn on the shower water conservation apparatus 10 at the beginning of a shower or to turn it off at the end of a shower. The simple shower cycle steps illustrated in the logic flow diagram 100 and as described herein can be implemented with minimal and simple enough electronics by persons skilled in the art that can function as described for several years on a common battery, for example, a lithium coin cell type of battery, that is readily available to consumers. Of course, an optional on-off switch (not shown) could be provided, if further battery life is desired.

The example shower water conservation apparatus 10 as described above is designed to provide an optimum combination of convenience, portability, and ease of use for shower users without complications or any need for complex instructions. Persons skilled in the art will be able to easily provide an appropriate electronic circuit with readily available electronic components, including the microcontroller 44, heat sensor 14, speaker 42, etc., to implement the functions as described in the system block diagram of FIG. 12 and to program a microcontroller 44 to provide the functions as shown in the steps of the logic flow diagram of FIGS. 13A and 13B as described above and as further described below. The microcontroller 44 may be, for example, a PIC16LF18345 microchip manufactured by Microchip Technology, headquartered in Chandler, Arizona. The heat sensor 14 may be, for example, a TMP235 active temperature sensor manufactured by Texas Instruments, Inc., headquartered in Dallas, Texas.

The parameters described above for the example logic flow diagram 100 in FIGS. 13A and 13B provide an optimum of simplicity and convenience to facilitate inducement of shower users to actually use the shower water conservation apparatus 10 for taking showers, including to follow the prompt signals that encourage conservation of shower water and energy. At the same time, some variation in those parameters is tolerable without significantly affecting or degrading the convenience of using the apparatus 10 or the inducement provided by the apparatus 10 to the users to conserve the shower water and energy used in taking a shower. For example, the 8-second sleep time at step 118 before returning to step 112 and then to the decision step 116 provides a practical time delay combined with the condition at step 116 (i.e, temperature rise equal to or greater than two (2) degrees Fahrenheit) for the rate of increase of the shower pipe P temperature to be an effective indicator of hot water W arriving in the shower pipe, thus an appropriate time for a person to begin taking a shower, while minimizing energy consumption in the circuit enough to provide a battery life of several years. However, a sleep function at step 118 in a range of four to twelve seconds and a temperature rise at step 116 in a range of one to four degrees Fahrenheit would still provide satisfactory detection of hot shower water arrival in the shower pipe P and satisfactory battery life for the purposes and benefits described above, although a sleep function at step 118 in a range of six to ten seconds and a temperature rise at step 116 in a range of one to three degrees is preferable.

As another example, the shower duration time for the microprocessor sleep step 126 can be set by an input device to the microcontroller 44, for example a dip switch 98, as explained above, and, as also explained above, an appropriate setting for such a shower duration, thus sleep time at step 126, may be, for example, six (6) seconds, for an effective and satisfying shower without unnecessary or excessive waste of shower water. However, as also explained above, other shower time settings can be provided by the input device, for example the 1, 2, 3, 4, 5, 6, 7, 8, 9, 10, 11, 12, 13, 14, or 15 minutes dip switch settings mentioned above, may be appropriate for different shower users in various circumstances. For example, an elderly or disabled person may need more shower duration time than some other people, or a person who shaves in the shower may need a longer shower duration time than a person who does not shave in the shower. In most circumstances, a shower duration time setting for step 126 may be in a range of two (2) to ten (10) minutes would be sufficient, with a range of four (4) to eight (8) minutes being preferable for the shower water conservation purpose of the example shower water conservation apparatus 10.

As another example, the post-shower sleep time of sixty-eight (68) seconds at step 130 mentioned above and shown in the logic flow diagram in FIG. 13B is a sleep time provided to allow the shower water, thus the shower pipe P, to have cooled enough after the shower is turned off for the microcontroller 44 to determine by steps 132, 112, and 116 that the shower water has been turned off, thus to resume the idle cycle through steps 118, 112, 114, and 116, as explained above, until a subsequent shower user turns the shower water on again and rising pipe temperature is again detected at step 116. However, that post-shower sleep time at step 132 could be a different time that is long enough to allow detectable cooling of the shower pipe P, but short enough to enable the microcontroller 44 to have determined that the shower water has been turned off before a subsequent shower is begun, for example, by another shower user. Accordingly, any time in a range of thirty (30) to one hundred-twenty (120) seconds is considered to be effective for implementing the function of that step 132 as described above, although a sleep time at step 132 in a range of fifty-five (55) to eight-five (85) seconds is considered to be preferable for most shower users and typical shower circumstances.

Also, any convenient short tune at step 104 that is shorter than a perceivably long tune at step 120 may be appropriate. For example, the short tune at step 104 may be three (3) to six (6) notes, and a long tune at step 120 that is perceivably longer than the short tune may be, for example, the notes of the short tune repeated in a range of two (2) to four (3) times.

As also mentioned above, the prompt signal can be a visual signal instead of, or in addition to, the audible signal described above. For example, a visual prompt signal can be produced by an optional LED device 43, which is illustrated, for example, in FIGS. 7, 9, and 10 as mounted on the printed circuit board 40 in the example shower water conservation device 10. The microcontroller 44 can be programmed to turn on the LED device 43 to produce light for a visual prompt signal at appropriate times in accordance with the explanation above for the audible prompt signal, for example, at step 120 in the logic flow diagram 100 in FIG. 13A. The cover portion 20 of the housing 16, or any part of the housing 16, can be made of a transparent or a translucent material to transmit the light produced by the LED device 43 to the outside of the housing 16 so that it is visible to a shower user. Also, the LED device 43 can optionally be a device that produces light in one or more colors, for example, a green light to indicate the hot shower water has arrived at the shower to prompt a shower user to get into the shower (e.g., at step 120 in the logic flow diagram 100 in FIG. 13A) and a red light when the shower time has elapsed to prompt the shower user to turn off the shower water (e.g., at step 128 in the logic flow diagram 100 in FIG. 13B). Of course, other colors and prompts at other times in the shower operation could also be implemented.

While a number of example aspects and embodiments have been discussed above, those of skill in the art may recognize certain modifications, permutations, additions, and sub combinations thereof. It is therefore intended that the following appended claims and claims hereafter introduced are to be interpreted and construed to include all such modifications, permutations, additions, and sub-combinations that are within true spirit and scope of the claims as written. The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof.

The invention and several embodiments in which an exclusive property or privilege is claimed are defined as follows:

1. Apparatus for prompting a person using a shower having a shower pipe to conserve shower water, comprising:

a housing including clamp mounting means for clamping the housing on the shower pipe, wherein the clamp mounting means includes two resilient flange clamp pieces extending in spaced apart relation to each other a sufficient distance for the housing to be positioned on the shower pipe with the two resilient flange clamp pieces on opposite sides of the shower pipe, and the spaced apart relation of the two resilient flange clamp pieces being a spaced apart distance that requires the two resilient flange clamp pieces to be elastically forced away from each other by the shower pipe when the housing is positioned on the shower pipe with the shower pipe between the two resilient flange clamp pieces such that a resilient material memory in the two resilient flange clamp pieces provide lateral clamping forces on the shower pipe sufficient to hold the housing on the shower pipe;

a prompt signal producing device in the housing;

a heat sensor mounted in the housing for sensing heat in the shower pipe and transducing the sensed heat to electric signals that are indicative of temperatures of the shower pipe;

a heat conducting pin mounted in the housing in a manner that extends from a position outside of the housing between the two resilient flange clamp pieces to a position inside the housing adjacent to the heat sensor for conducting heat from the shower pipe outside of the housing to the heat sensor inside the housing, wherein the heat conducting pin is movable axially to accommodate physical contact of the pin with the shower pipe when the housing is mounted on the shower pipe with the shower pipe positioned between the two resilient flange clamp pieces; and a microcontroller mounted in the housing and connected to the heat sensor and to the prompt signal producing device, the microcontroller being programmed to process temperature indicating signals from the heat sensor to drive the prompt signal producing device to produce prompt signals that are perceivable by the person using the shower.

2. The apparatus of claim 1, wherein the heat conducting pin is in physical contact with the heat sensor, and wherein the heat sensor is movable conjointly with the heat conducting pin to maintain the physical contact of the heat conducting pin with the heat sensor.

3. The apparatus of claim 2, wherein the heat sensor is mounted on a printed circuit board in the housing, and wherein the printed circuit board is movable in a manner that accommodates the conjoint movement of the heat sensor with the heat conducting pin.

4. The apparatus of claim 3, including a spring in the housing that applies a force to the printed circuit board that biases the printed circuit board to maintain physical contact between the heat sensor and the heat conducting pin.

5. The apparatus of claim 3, wherein the printed circuit board has opposite ends, and wherein one of the opposite ends of the printed circuit board is mounted in the housing in a pivotal manner and the other of the opposite ends of the printed circuit board is mounted in the housing in a manner that allows movement of the printed circuit board in the same direction as the axial movement of the heat conductive pin.

6. Apparatus for prompting a person using a shower having a shower pipe to conserve shower water, comprising:

a housing including mounting means for mounting the housing on the shower pipe;

a prompt signal producing device in the housing;

a heat sensor mounted in the housing for sensing heat in the shower pipe and transducing the sensed heat to electric signals that are indicative of temperatures of the shower pipe; and a microcontroller mounted in the housing and connected to the heat sensor and to the prompt signal producing device, the microcontroller being programmed to acquire and process temperature indicating signals from the heat sensor to drive the prompt signal producing device to produce prompt signals that are perceivable by the person using the shower, wherein the process includes: (i) obtaining a current pipe temperature by acquiring the electric signals from the heat sensor and processing those electric signals to produce a digital value that is indicative of the current pipe temperature; (ii) saving that current pipe temperature as a last pipe temperature; (iii) obtaining a new pipe temperature by newly acquiring the electrical signals from the heat sensor and processing those newly acquired electrical signals to produce a digital value that is indicative of the new pipe temperature; (iv) comparing the new pipe temperature to the last pipe temperature and determining if the new pipe temperature is increased by at least a predetermined threshold amount of temperature increase; (v) if the new pipe temperature is not increased by at least the predetermined threshold amount of temperature increase, then the microcontroller goes into sleep mode for a preset sleep time, after which the microcontroller wakes up, updates the last pipe temperature in memory to be equal to the current pipe temperature that was obtained before the sleep mode, and updates the current pipe temperature in memory by obtaining a new current pipe temperature by newly acquiring the electrical signals from the heat sensor and processing those newly acquired electrical signals to produce a digital value that is indicative of the new current pipe temperature; (vi) performs another comparison of the new current pipe temperature with the last pipe temperature to determine if the new current pipe temperature is increased by at least the predetermined threshold amount of pipe temperature increase; (vi) if the new current pipe temperature has increased by at least the predetermined threshold amount of temperature increase, then the microcontroller drives the prompt signal device to produce a prompt signal that is perceivable by the person using the shower to indicate that hot water has arrived in the shower pipe and then goes into a sleep mode for a predetermined shower duration time, after which shower duration time the microcontroller awakes, drives the prompt signal device to produce another prompt signal that is perceivable by the person using the shower to indicate that the predetermined shower duration time has elapsed, whereupon the microcontroller goes into sleep mode for a predetermined cooling time, after which cooling time the microcontroller awakes again, gets a new current pipe temperature by newly acquiring the electrical signals from the heat sensor and processing those newly acquired electrical signals to produce a digital value that is indicative of the new current pipe temperature, and updates the last pipe temperature in memory to be equal to that new current pipe temperature, and then gets a still newer current pipe temperature by newly acquiring the electrical signals from the heat sensor and processing those newly acquired electrical signals to produce a digital value that is indicative of the new current pipe temperature; and (vii) then cycling back to again compare the new pipe temperature to the last pipe temperature and determine if the new pipe temperature is increased by at least the predetermined threshold amount of temperature increase, and repeat the process cycles recited above based on the results of the determination as recited above.

7. A method for prompting a person using a shower to conserve shower water, comprising:

(i) obtaining a current temperature of the shower pipe;

(ii) saving that current pipe temperature as a last pipe temperature;

(iii) obtaining a new current pipe temperature of the shower pipe;

(iv) comparing the new current pipe temperature to the last pipe temperature and determining if the new current pipe temperature is increased by at least a predetermined threshold amount of temperature increase;

(v) if the new pipe temperature is not increased by at least the predetermined threshold amount of temperature increase, then waiting for a preset sleep time, after which preset sleep time making the last pipe temperature equal to the current pipe temperature that was obtained before the sleep time and then getting a new current pipe temperature for another comparison with the last pipe temperature;

(vi) determining if the new current pipe temperature is increased by at least the predetermined threshold amount of pipe temperature increase;

(vii) if the new pipe temperature has increased by at least the predetermined threshold amount of temperature increase, then driving a prompt signal device to produce a prompt signal that is perceivable by the person using the shower to indicate that hot water has arrived in the shower pipe and then waiting for a predetermined shower duration time;

(viii) after waiting for the predetermined shower duration time, driving the prompt signal device to produce another prompt signal that is perceivable by the person using the shower to indicate that the predetermined shower duration time has elapsed;

(ix) waiting for a predetermined cooling time;

(x) after the predetermined cooling time, getting a new current pipe temperature and making the last pipe temperature equal to that new current pipe temperature, and then getting another current pipe temperature; and (xi) repeating the comparing of step (iv) and thereafter continue cycling through the steps (v) through (xi) indefinitely.

8. The method of claim 7, wherein the preset sleep time is in a range of four (4) to twelve (12) seconds.

9. The method of claim 7, wherein the preset sleep time is in a range of six (6) to ten (10) seconds.

10. The method of claim 7, wherein the predetermined amount of temperature increase is in a range of one (1) to four (4) degrees Fahrenheit.

11. The method of claim 7, wherein the predetermined amount of temperature increase is in a range of one (1) to three (3) degrees Fahrenheit.

12. The method of claim 7, wherein the shower duration time is in a range of two (2) to ten (10) minutes.

13. The method of claim 7, wherein the shower duration time is in a range of four (4) to eight (8) minutes.

14. Apparatus for indicating when shower water in a shower pipe is at a temperature for use, comprising:

a housing including mounting means for mounting the housing on the shower pipe, a prompt signal producing device in the housing;

a heat sensor mounted in the housing for sensing heat in the shower pipe and transducing the sensed heat to electric signals that are indicative of temperatures of the shower pipe; and a heat conducting pin mounted in the housing in a manner that extends from a proximal end outside the housing to a distal end inside the housing in contact with the heat sensor, wherein the heat conducting pin is mounted in a sliding manner in a sleeve that includes a resilient latch finger that extends from a base portion of the sleeve to a distal end of the latch finger, wherein the heat conducting pin includes a shank portion with a slot extending longitudinally toward, but not all the way to, the distal end of the heat conducting pin, and wherein the resilient latch finger is resiliently biased inwardly toward a center of the sleeve, whereby the distal end of the latch finger extends into the slot in the heat conducting pin when the heat conducting pin is positioned in the sleeve.

15. The apparatus of claim 14, wherein the slot terminates at a shoulder at a distal end of the slot, and wherein longitudinal movement of the heat conducting pin in a direction toward the outside of the housing causes the distal end of the latch finger to contact and bear on the shoulder at the distal end of the slot to thereby retain the heat conducting pin in the sleeve.

16. The apparatus of claim 14, wherein the heat conducting pin has a flanged head at a proximal end of the heat conducting pin that is too large to enter the sleeve and thereby limits slidable movement of the heat conducting pin positioned in the sleeve toward the inside of the housing.

* * * * *